United States Patent [19]

Keith

[11] Patent Number: 4,484,808

[45] Date of Patent: Nov. 27, 1984

[54] METHOD OF AND APPARATUS FOR CONTROLLING SCENE RADIATION

[75] Inventor: Laura E. Keith, Reading, Mass.

[73] Assignee: Polaroid Corporation, Cambridge, Mass.

[21] Appl. No.: 438,019

[22] Filed: Nov. 1, 1982

[51] Int. Cl.$^3$ .............................................. G03B 7/099
[52] U.S. Cl. ...................................... 354/433; 354/483
[58] Field of Search ................... 354/31, 59, 433, 481

[56] References Cited

U.S. PATENT DOCUMENTS

| | | | |
|---|---|---|---|
| 2,206,196 | 7/1940 | Kubitzek | 88/23 |
| 2,455,116 | 11/1948 | Gittus | 88/22.5 |
| 3,105,428 | 10/1963 | La Rue, Jr. | 95/10 |
| 3,134,021 | 5/1964 | Ploke | 250/229 |
| 3,232,192 | 2/1966 | Stimson | 95/10 |
| 3,415,644 | 12/1968 | Land | 96/3 |
| 3,428,403 | 2/1969 | Konishi | 356/222 |
| 3,475,616 | 10/1969 | Stimson et al. | 250/226 |
| 3,500,730 | 3/1970 | Matsubara et al. | 95/10 |
| 3,511,142 | 5/1970 | Biber | 95/10 |
| 3,518,926 | 7/1970 | Bing | 95/10 |
| 3,529,523 | 9/1970 | Haskell | 95/10 |
| 3,594,165 | 7/1971 | Rogers | 96/3 |
| 3,614,921 | 10/1971 | Yamanaka et al. | 354/31 X |
| 3,651,749 | 3/1972 | De Groot | 95/64 D |
| 3,672,268 | 6/1972 | Scheibel et al. | 95/10 CE |
| 3,872,487 | 3/1975 | Gold | 354/86 |
| 4,079,388 | 3/1978 | Takahama et al. | 354/31 |
| 4,109,263 | 8/1978 | Johnson | 354/150 |
| 4,119,980 | 10/1978 | Baker | 354/150 |
| 4,173,400 | 11/1979 | Faramarzpour | 354/27 |
| 4,175,843 | 11/1979 | Douglas | 354/31 |
| 4,189,218 | 2/1980 | Saito et al. | 354/31 X |
| 4,230,400 | 10/1980 | Wick et al. | 354/25 |
| 4,285,583 | 8/1981 | Canter | 354/23 D |
| 4,291,959 | 9/1981 | Easterly | 354/31 |
| 4,304,476 | 12/1981 | Bloom | 354/49 |
| 4,313,654 | 2/1982 | Matsui et al. | 354/25 |
| 4,345,828 | 8/1982 | Johnson | 354/27 |
| 4,352,545 | 10/1982 | Uno et al. | 354/25 |

OTHER PUBLICATIONS

"Method and Apparatus Employing Dual Photocells for Removing Spectral Filter During Strobe Pulse", by Bruce K. Johnson, filed Dec. 31, 1979.

Primary Examiner—Michael L. Gellner
Attorney, Agent, or Firm—Leslie J. Payne

[57] ABSTRACT

A compact optical assembly is disclosed for use in controlling the direction of radiation from a scene in a scene evaluating arrangement. Included in this assembly is an arrangement having different optical portions for optically directing scene radiation along independent paths to an array of closely spaced photoresponsive regions. At least a pair of adjacent optical portions directs the scene light along adjacent paths such that portions of scene light along the adjacent paths would intersect prior to reaching at least one region. Means for internally reflecting at least some of the scene radiation which would intersect is provided so as to reduce optical crosstalk between the adjacent paths.

15 Claims, 5 Drawing Figures

METHOD OF AND APPARATUS FOR CONTROLLING SCENE RADIATION

BACKGROUND OF THE INVENTION

This invention relates in general to exposure control systems. In particular, it relates to an improved method and optical assembly for use in controlling scene radiation in a light detecting device of an exposure control system usable in an image recordable apparatus.

Automatic exposure control systems are well-known in the photographic arts. Typically, such systems include a photometer having a photoresponsive transducer and a lens element or system. The lens system receives scene radiation from a preselected area of the scene to be photographed and directs such scene radiation onto the photosensitive surface of the transducer. The transducer's output may be utilized to predict a photographic exposure condition or actually control the closing of an automatic shutter mechanism at an appropriate film exposure condition. The output signal from such photometers is directionally responsive to the influence of the scene radiation from various scene objects within its field of view. Because photometers are directionally responsive, highly accurate control of exposure is difficult to obtain. In this regard, most of the exposure control systems known in the prior art employ a single photocell. Single cell photometers, however, present certain drawbacks especially during flash and ambient modes. In this regard, single photocells tend to react to the average brightness of a field substantially corresponding to the camera's field of view. Unfortunately, the average field brightness often differs from the brightness of selected zones. For instance, central or lower zones of the field have been found to be more representative of the brightness of the subject. Thus, when the brightness of these peripheral or upper field zones contrast with the brightness of central or lower field zones, an incorrect exposure for the more important subject normally occupying the center or lower zones results. Consider, for example, horizontal landscapes illuminated by skylight or sunlight, it is desirable generally to have a photometer look generally downwardly so as to minimize the influence of the sky. When there is a portrait scene with an artificial light source, it is desirable to have a photometer look straight ahead. This is done so that it receives substantially all the light reflected from the central portion of the scene and thereby properly exposes for flesh tones.

To correct for the noted drawbacks several proposals have been put forward. One has been to alter the acceptance angle of the photometer so that it evaluates scene radiation from different scene zones or portions. This is typically done in photographic systems having distinct exposure modes, for example, systems having distinct flash and ambient modes. Examples of such acceptance angle altering devices are shown in the following U.S. Pat. Nos: 3,511,142; 3,232,192; and 4,173,400.

Another proposal is to use a multi-photocell array. Commonly-assigned U.S. Pat. Nos. 3,511,142, 3,529,523 and 4,285,583 disclose photometric devices using an array of photocells arranged so that under certain conditions, each photocell receives light from a preselected portion of the entire scene. In U.S. Pat. No. 3,529,523 there is disclosed means for selectively interposing a device relative to a plurality of photocells so that during the flash mode each photocell images the entire scene and during the ambient mode each photocell receives an equal portion of the entire scene.

Recently, cameras have been proposed which do not have distinct flash and ambient exposure modes. Such cameras are referred to generally as proportional fill-flash types. The exposure control systems used in such types operate to control firing of an electronic quench type strobe under a range of natural lighting intensities so that film exposure is due to a mixture of available natural light and strobe light. The strobe light is proportioned in accordance with the intensity of the natural available light. In such system, it has been determined that exposure is also enhanced significantly if the flash and ambient modes are spectrally filtered differently. More to the point, it has been determined that during the flash, the evaluation of infrared frequencies, which frequencies normally are blocked during ambient, improves exposure.

One known approach to further improve exposure in such cameras is disclosed in commonly-assigned U.S. Pat. No. 4,345,828 wherein the acceptance angle is shifted automatically during the exposure mode so as to accommodate for flash and ambient modes.

To further improve exposure in such types of cameras it has been also proposed to use a pair of photocells so that one is used during ambient and the other is used during a pulse of artificial illumination. In this regard, commonly assigned and copending U.S. Pat. application Ser. No. 108,381, filed Dec. 31, 1979, by Bruce K. Johnson, and entitled "Method and Apparatus Employing Dual Photocells For Removing Spectral Filter During Strobe Pulse", discloses the use of a pair of photocells each of which is responsive to different spectral frequencies during flash and ambient modes. In particular, there is provided an electronic switching arrangement for automatically switching between photocells so that one is spectrally filtered during the ambient portion of an exposure interval in a different manner than the other during flash. A problem arising from such arrangement is optical crosstalk. That is, undesired spectrally filtered scene radiation intended for one of the photocells travels to the other photocell.

It is known to use mechanical light controlling elements to block crosstalk. Practically speaking, however, use of mechanical light controlling elements presents several difficulties, especially in systems of the foregoing type. This is because space considerations dictate that such mechanical elements be exceedingly small. Thus, there are potential problems with attempting to accurately position them as well as the potential that such small elements might, when once in use, become dislodged so as to adversely effect their intended light controlling function.

While it has been proposed to use the concept of total internal reflection for redirecting scene radiation in photographic apparatus, such proposals have, for the most part, used relatively large prism structures. These provide for highly-folded light paths between the objective and the film plane. Examples of such an approach are disclosed in commonly-assigned U.S. Pat. Nos. 4,119,980 and 4,109,263.

None of the known approaches have, however, attempted to solve the problems of optical crosstalk associated with closely spaced photoresponsive regions in exposure control systems, let alone solve such problems in a simple, efficient and economical manner.

SUMMARY OF THE INVENTION

It is one object of the present invention to overcome the drawbacks mentioned above by providing a compact optical assembly for use in a scene evaluating system having an array of scene radiation sensors mounted in closely spaced relationship. Included in this assembly is means for directing scene radiation from the scene along independent paths to selected ones of the sensors. Included in the directing means are at least a pair of adjacent optical portions which direct the scene radiation along adjacent paths such that portions of scene radiation along the adjacent paths would intersect prior to reaching at least one region. Means are provided for internally reflecting at least some of the radiation which would intersect so as to reduce optical crosstalk between the adjacent paths.

In a preferred embodiment, the optical portions form part of a lens element and the means for providing internal reflection includes material having a lower index of refraction than the optical portions so as to create a zone of internal reflection. This zone is located between the adjacent paths so as to reduce optical crosstalk therebetween.

In another preferred embodiment, the optical portions and means for providing internal reflection form a separate component spaced from a lens element so as to reduce optical crosstalk between adjacent paths of scene radiation traveling along the adjacent paths from the lens.

Among the other objects of the invention are, therefore, the provision of an improved optical assembly for controlling scene radiation; the provision of an improved optical assembly usable in a scene evaluating system of an image recording apparatus; the provision of a scene evaluating arrangement for controlling scene radiation to a plurality of closely-spaced photoresponsive regions; the provision of an arrangement as noted above wherein the means for controlling the scene radiation includes means for causing total internal reflection of portions of adjacent paths of scene radiation to closely spaced photocells; the provision of an arrangement wherein the total internal reflection means is arranged to reduce optical crosstalk between adjacent paths of scene radiation; the provision of an arrangement wherein a separate transparent block of material is interposed between a lens and a plurality of closely-spaced photocells; and, the provision of an arrangement wherein a slot in the block helps define the means for causing the noted total internal reflection. The present invention contemplates methods for achieving the foregoing objects.

These and other objects and further scope of applicability of the present invention will become apparent from the detailed description to follow when taken in conjunction with the accompanying drawings wherein like parts are designated by like reference numerals throughout the several views.

DETAILED DESCRIPTION

Figure 1:
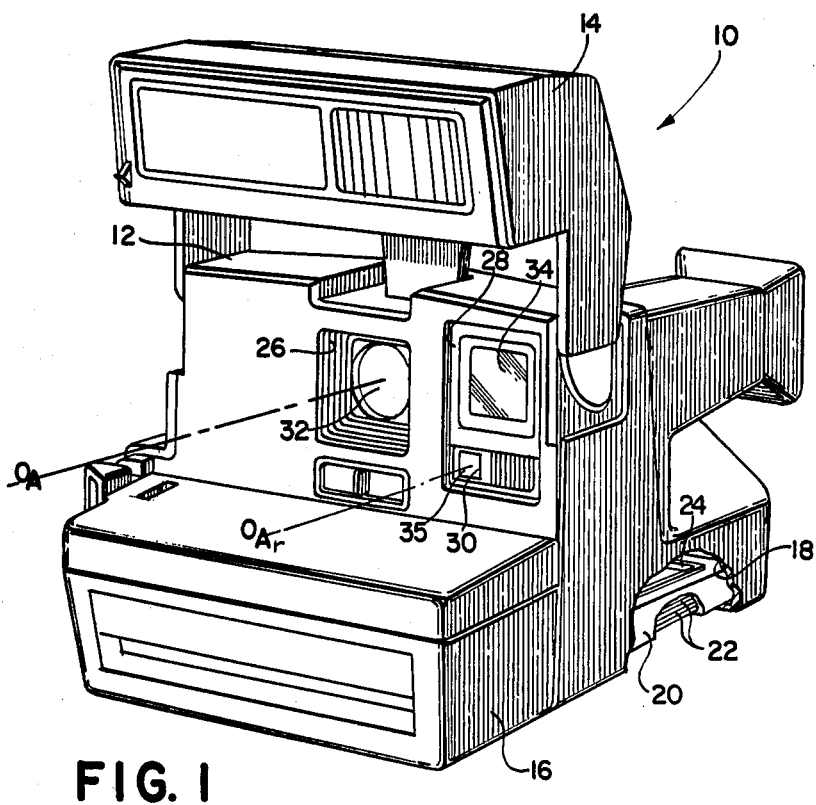
FIG. 1 is a perspective view, partly in section, showing a photographic apparatus employing the present invention.

FIG. 1 discloses a fully automatic type camera of the so-called instant type which uses self-processable film and being designated generally by reference numeral 10. It is to be understood that the present invention is not specifically limited to use with such types of photographic apparatus. Indeed the present invention contemplates its use in other types of image recordable apparatus.

As best seen in FIG. 1, the camera includes a rigid camera housing body 12 having pivotally mounted thereon an electronic flash unit 14. This flash unit 14 is manually movable between an erect position, such as illustrated in FIG. 1, and a folded or inoperative position (not shown) wherein the flash unit covers a portion of the front surface of the camera body 12. In this embodiment, the camera body 12 is defined as having a generally prismatic shape. Included in the body 12 is a generally rectangularly-shaped film loading door 16. The door 16 is shown in a latched or closed position, and when unlatched moves to a folded, open position, not shown. When in this latter open position, the door 16 provides access to the interior 18 of the camera. Owing to this a film pack 20 or cassette can be slidably received within such interior.

Details of the film pack 20 do not, per se, form a portion of the present invention. Thus, only those parts considered important to an understanding of this invention will be described. For greater detail of such a film pack, reference is made to commonly-assigned U.S. Pat. No. 3,872,487. Also, the individual film units 22 to be releasably stored within the film pack 20 are of the type generally described in commonly-assigned U.S. Pat. Nos. 3,415,644 and 3,594,165. The film units 22 are of the self-processing type. The film pack housing has a generally rectangular aperture 24 formed therein and each of the film units is mounted to be in successive registration with and biased towards the aperture 24. Beneath the stacked array of film units 22 is a thin battery which is electrically coupled, in a well-known manner, to the various electrical systems of the camera. The film pack aperture 24 defines the field of view of the subject matter which will be recorded during exposure.

Formed in the vertical front wall portion of the housing 12 are a number of apertures designated generally at 26, 28 and 30. Mounted in registration with the taking lens aperture 26 is an objective taking lens 32 which is arranged along an optical axis, OA. The lens 32 is positioned forwardly of an aperture (not shown) formed in an opaque exposure chamber (not shown) formed by the housing 12. Located in this exposure chamber is a generally trapezoidal-shaped mirror, also not shown, which is arranged at a predetermined angle with respect to the optical axis, OA, and the film plane. The mirror provides a folded light path between the image forming scene rays being directed by the objective taking lens 32 and the uppermost one of a film unit 22 held in the film pack 20.

Mounted in registration with the viewfinder aperture 28 is a negative lens 34 which forms part of a reversed Galilean viewfinder that is structured, in a well-known manner, to have its field of view substantially coextensive with that of the taking lens 32.

Figure 4:
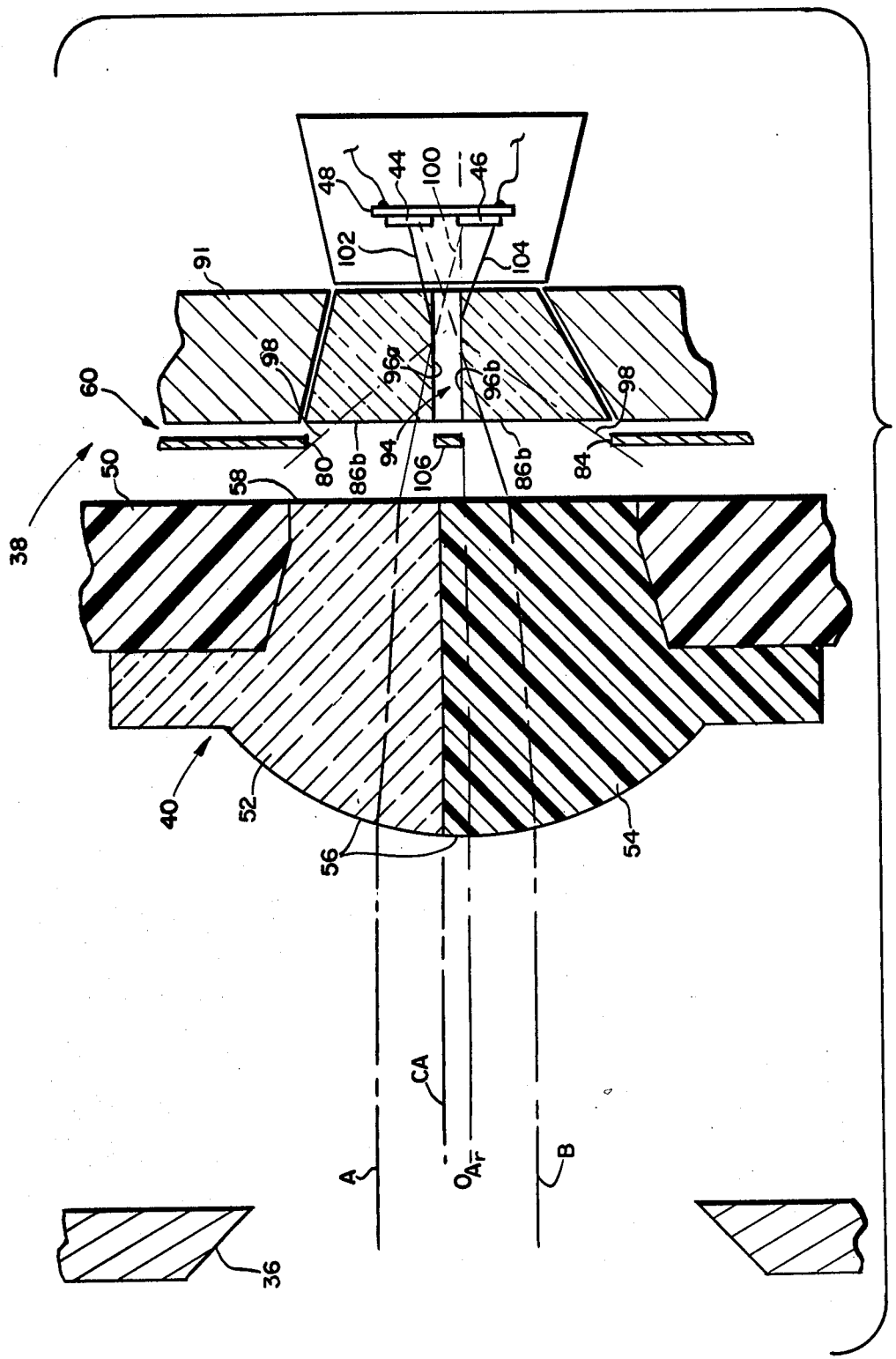
FIG. 4 is a side view in section showing the improved optical element of the present invention incorporated in an exposure control used for controlling exposure.

The photocell aperture 30 is located beneath the viewfinder aperture 28 and has a window 35 mounted therein which is aligned with the entrance to a hood 36 (FIG. 4). The aperture 30 and the hood 36 are arranged along an optical axis, $OA_r$, and are structured to admit scene radiation into the interior of the camera housing 12.

Figure 2:
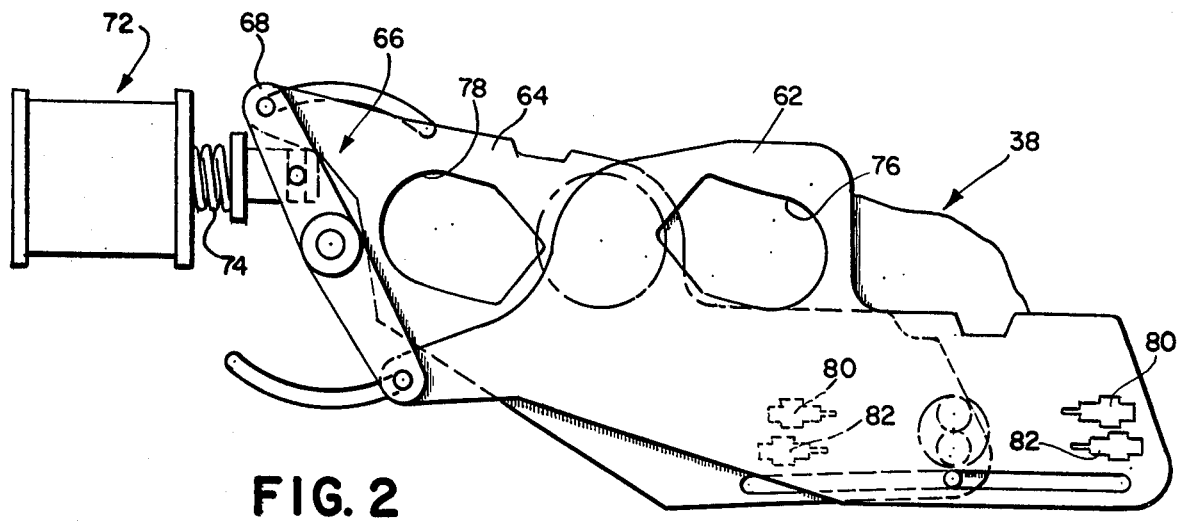
FIG. 2 is an enlarged elevational view showing a shutter mechanism exposure control system in which the improved optical arrangement of the present invention is utilized.
Figure 3:
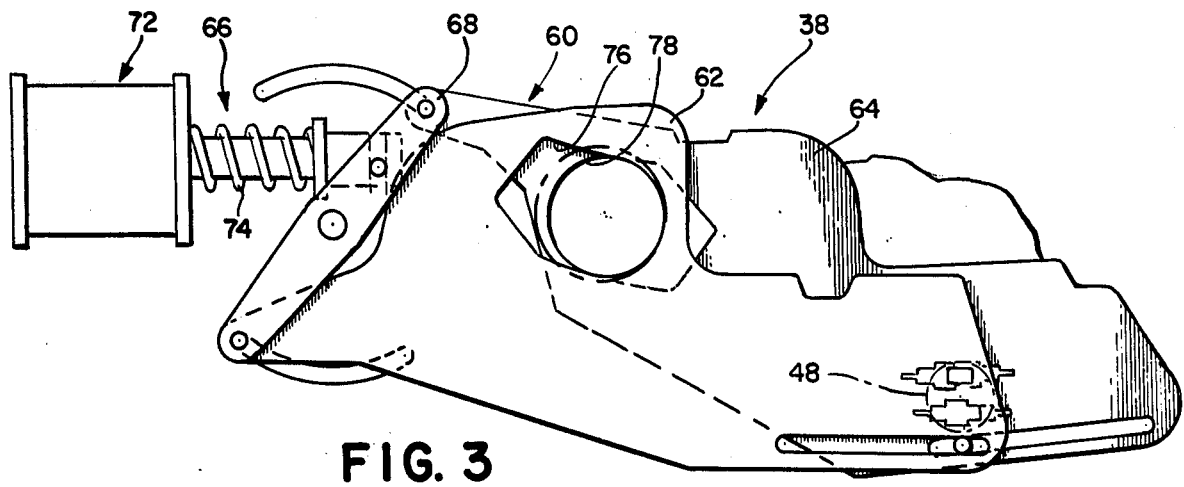
FIG. 3 is a view similar to FIG. 1, but showing the mechanism in a different operative position.
Figure 5:
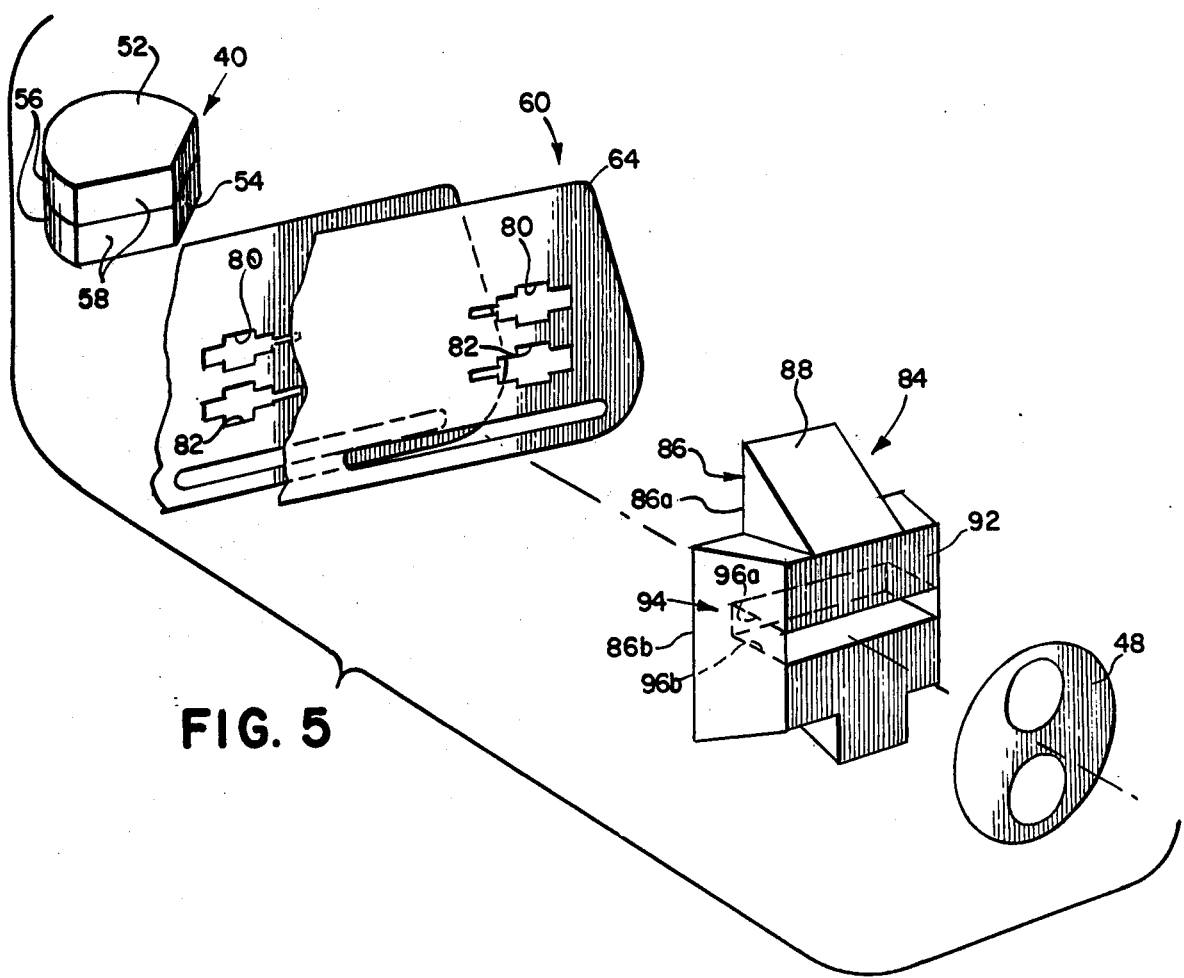
FIG. 5 is an exploded perspective view showing the improved optical arrangement of the present invention in relationship to photoresponsive cells and the shutter blades of the exposure control system.

Reference is now made to FIG. 4 along with FIGS. 2, 3 and 5 for better illustrating the improved exposure control system 38 made in accordance with the present invention. Since the exposure control system 38 does not, per se, form an aspect of the present invention, only those details necessary for an understanding of the present invention will be set forth. However, reference is made to commonly-assigned U.S. Pat. No. 4,345,828 for more information relating to such a system. Located behind the exit aperture of the hood 36 is an optical element 40 behind which is positioned a photodetector 42. Preferably, the photodetector 42 is of the photoelectric type and is suitably secured to camera housing 12. In this embodiment, the photodetector 42 is comprised of two photoresponsive cells or regions 44, 46; respectively, which may be, for purposes of manufacturing convenience, manufactured on a single substrate 48. The axes of both the photocells 44, 46 are generally centered about the central axis, CA, of the optical element 40 which is offset from the optical axis, $OA_r$.

The photocells can be connected electrically to an exposure control network, not shown, but forming part of the exposure control system 38 for purposes of controlling photographic functions, such as the termination of exposure in a well-known manner. Each of the photocells provides an electrical output signal which varies in accordance with the amount of scene radiation incident thereon. The mounted photocells 44, 46 are spaced behind the optical element by a distance which is equal generally to the focal length of the optical element 40.

The optical lens element 40 is mounted on and supported by an interior wall 50 of the camera housing 12 and is comprised of a pair of upper and lower lens portions or segments 52 and 54; respectively. These lens segments 52, 54 do not, per se, form an aspect of the present invention. Therefore, only those details thereof necessary to understand the present invention will be set forth. For more details of their construction, function and operation, reference is made to commonly-assigned U.S. Pat. No. 4,345,828. Essentially, each of the symmetrically formed lens segments 52, 54 collects scene radiation from the scene and directs such scene radiation to each of the photocells 44, 46. Briefly, each of the upper and lower optical lens segments 52, 54 includes a generally convex surface 56 preferably with a spherical shape and having opposed thereto a rear prism-like conformation 58. The prism conformations 58 are suitably constructed and received by the interior wall 50 so as to be optically aligned with the respective photocells 44, 46 for converging scene radiation to the latter. Each of the optical lens segments 52, 54 is molded as a single plastic piece having different spectral filtering properties. In this regard, the upper lens segment 52 provides spectral filtering so that spectral frequencies in the visible range (e.g., 400–700 nm) are transmitted, while spectral frequencies in the near infrared IR region (e.g., 700–1200 nm) are blocked. On the other hand, the lower lens segment 54 operates conversely to the above segment 52 with respect to the spectral filtering functions. In particular, the lower lens segment 54 transmits frequencies in the near infrared range while excluding or blocking frequencies in the noted visible spectrum.

For exposure control purposes, it should be pointed out that the upper optical lens segment 52 is used predominantly in situations involving moderate-to-high ambient light when primary aperture values are less than maximum. As noted above, a flash can be fired during this type of ambient exposure and the reflected light thereof evaluated in accordance with the invention without the benefit of IR radiation. Since flash contribution under these levels of ambient light is not controlling, the lack of precise flash accuracy is tolerated in favor of ambient control. The lower optical lens segment 54 is used predominantly in situations involving firings of the flash strobe unit 14 when the ambient light is very low, and accordingly the flash contribution is significant as compared to the ambient. Under these situations, the primary effective aperture is at a maximum and only the infrared spectral frequencies will be evaluated. Because of IR evaluation, the likelihood of widely varying reflectivity values influencing the photocells 44, 46 in an adverse manner is overcome because of the relatively more uniform reflectivity values derived by evaluating with infrared frequencies.

Scene light to the photocells 44, 46 is, in part, controlled by the exposure control system 38, which includes a blade mechanism 60. Essentially, the blade mechanism 60 operates to selectively unblock and block different portions of the optical path $OA_r$ to the photocells 44, 46 as well as selectively unblock and block scene light along the optical path OA to the film units 22. Since details of the blade mechanism do not form an aspect of the present invention, only a brief description thereof will be set forth for purposes of describing the present embodiment. For a more detailed description of such a blade mechanism, reference is made to commonly-assigned U.S. Pat. No. 4,040,072.

As best shown in FIGS. 2 and 3, the blade mechanism is comprised of a pair of overlapping, opaque, scanning-type shutter blades 62, 64. Each blade of the blades 62, 64 is reciprocally driven by a common pivoting walking beam mechanism 66. The walking beam mechanism 66 includes a pivotally mounting walking beam 68 to which the blades 62, 64 are pinned in a well-known manner to a block casting (not shown) attached to the interior of the camera body 12. Attached to the walking beam 68 is a solenoid assembly 72 which drives the blades 62, 64 to the blocking position as illustrated in FIG. 2 when energized. When the solenoid assembly 72 is de-energized, a biasing spring 74 serves to drive the blades 62, 64 to their unblocking position (FIG. 3). The blades 62, 64 are normally held in the blocking position against the bias of the spring 74 by a known mechanical shutter latching device (not shown), but described in the last-noted patent.

The shutter blades 62, 64 each have a primary aperture 76 and 78; respectively. The primary apertures 76, 78 serve to progressively overlap with each other such that they coincide with respect to the optical path OA. These primary apertures 76, 78 define the effective aperture value along the optical axis OA.

Provided in each of the blades 62, 64 is a pair of upper and lower secondary photocell apertures 80, 82; respectively, which permit scene light to simultaneously impinge upon the pair of photocells 44, 46 in correspondence with the scene light admitted to the film unit 22 during movement of the blades 62, 64 during the exposure cycle of the camera 10. The upper secondary apertures 80 progressively coincide in overlying relationship to the photocell 44, while the lower secondary apertures 82 progressively coincide in overlying relationship to the photocell 46. In this regard, simultaneously with enlarging primary aperture values, the secondary photocell apertures define a corresponding progressively enlarging secondary effective aperture over the photocells 44, 46. As noted, the photocell output signals can be directed to an integration circuit (not shown).

Reference is now made to FIGS. 4 and 5 for showing the compact optical assembly or arrangement made in accordance with the present invention. As depicted, the optical assembly 84 is positionally interposed between the optical lens segments 52, 54 as well as the photocells 44, 46 such that its central axis is coincidental to the axis CA (FIG. 4). Essentially, the optical member 84 is optically associated with the lens segments 52, 54 so that it can redirect scene radiation in a manner to be described presently. As will be explained, the scene radiation traveling through the upper and lower lens segments 52, 54 will be channeled to the upper and lower photocells 44 and 46. The lens segments extend over a greater length as measured in the longitudinal direction of the optical element 40 than the length of its corresponding sensor or photocell.

The optical assembly 84 in this embodiment is made as an integral transparent optical block member having a front face 86 having upper and lower segments 86a,b which are generally perpendicular to the optical axis OA and aligned with the optical segments 52, 54; respectively. Preferably, the optical assembly 84 is fabricated from a transparent plastic material, such as polycarbonate or any other suitable optical plastic or glass. A pair of diametrically opposed, rearwardly converging surfaces 88 are formed in the optical assembly and are seated against the complementary surfaces 90 of an apertured wall 91 by a suitable holding device (not shown). The complementary surfaces 90 are tapered so that light rays striking it do not bounce toward the photocells. The converging surfaces 88 terminate at a back face 92 parallel to the front face. Centrally formed in the front face 86 is a slot 94 whose axis is aligned to the axis CA. In this embodiment, the slot 94 contains air. Air has an index of refraction less than that of the polycarbonate material. As a result, surfaces 96a, 96b which form the slot 94 respectively are adjacent a medium of a lower index of refraction. Thus, scene radiation incident on the surfaces 96a,b are redirected, by virtue of total internal reflection, when such scene radiation is at an angle less than the critical angle. When the scene radiation falls outside the critical angle, the scene radiation passes through the slot 94. The critical angle is defined by the ratio of the indices of refraction of the two mediums. By way of illustration, the index of refraction of air is 1.0, while the index of refraction of optical member 84 is 1.4. Based on these indices, the critical angle is 41.6°; such as indicated by lines 98. In this embodiment, the critical angle, as well as the inclination of the surfaces 96a,b, are arranged in such a manner that the critical angle, as indicated by lines 98, is oriented in such a fashion as to encompass virtually all the scene radiation directed to the photocells 44, 46 by the photocell apertures 76, 78 and the lens segments 52, 4. The slot 94 in effect creates a zone of total internal reflection.

The present invention contemplates, of course, varying the critical angle. This could be accomplished by suitably adjusting the noted ratio of the indices of refraction.

Another way to change the effect of the critical angle on the incident scene radiation would be to change the angular orientation of the internal surfaces 96a,b. In other words, even though the critical angle, per se, does not change, the effect of the total internal reflection on incident radiation can be altered by changing the angular orientation of the surfaces 96a,b. Thus, the effect of the critical angle, as indicated by lines 98, with respect to incoming scene radiation is changed. Hence, the proportion of scene radiation falling within the critical angle and totally internally reflected can be varied.

Reference is made once again to FIG. 4 for showing how the optical member 84 is successful in eliminating or reducing optical crosstalk. As shown, some scene radiation traveling along one path, indicated by ray trace A, through the photocell apertures 80 and the upper optical portion 52 would, if not totally internally reflected by the optical member 84, strike the lower photocell 46; as is indicated by the extended dashed line 100. Such scene radiation is, however, redirected as shown by line 102 because of total internal reflection so that it strikes the photocell 44. Thus, the photocell 46, when operative, such as during the pulse of illumination, will not have striking it any of the spectrally filtered scene radiation traveling through the upper optical segment 52. Likewise, when the photocell 44 is operative, such as during the so-called ambient portion of the evaluation period, it will not have striking it any of the scene radiation traveling through the lower optical segments 54. In this latter case, some scene radiation traveling along an independent path indicated by ray trace B through the coinciding lower photocell apertures 82 and the lower optical segment 54 which would otherwise strike the photocell 44 will be totally internally reflected upon encountering the surface 96b and redirected as shown by line 104 to the photocell 46.

As a result of the foregoing, the scene radiation traveling through the upper and lower segments 52, 54, which would otherwise be directed to a non-intended photocell, is totally internally reflected in a direction back to the photocell intended to receive such spectrally filtered radiation. Consequently, the photocell 44 will be responsive essentially to visible spectral frequencies, while the photocell 46 will be responsive essentially to the infrared spectral frequencies. It is apparent readily that optical crosstalk between visible and infrared frequencies is eliminated.

Advantageously, the optical member 84 also increases total output current of each photocell. This is beneficial because it enhances the signal-to-noise ratio of each photocell. Further, towards the end of insuring that the scene radiation will be directed along the separate paths, it is intended that a bridging portion 106 of the shutter blades 62, 64 be of such a dimension that it blocks scene radiation entering the slot 94 generally along the axis CA. Although the shutter blades 62, 64 provide such a blocking function, it will be realized, of course, that the blocking function could be accomplished by other suitable means, such as a mechanical mask.

Advantageously, the optical arrangement 84 is shown as an integral block structure. As a result, it is relatively easier to assemble in a compact scene evaluating system as shown than would a thin reflector interposed in the space presently occupied by the slot 94.

Advantageously, the scene radiation including the totally internally reflected scene radiation striking the photocells 44, 46 effectively increases the field of view or acceptance angle of each of the photocells.

Of course, the present invention envisions that the upper and lower lens portions 52, 54 can be separated. However, by having them formed integrally as well as having the slot 94 centrally disposed therebetween there is provided a simple, economical and optically efficient arrangement which allows for formation of mutually exclusive optical paths.

The present invention also contemplates that a reflecting piece or an opaque piece could be introduced into the slot 94. This would be done so as to block scene radiation through the slot.

In accordance with the present invention, it will be appreciated that a compact optical assembly or arrangement is provided which could create a multiplicity of mutually exclusive light paths, wherein each path is directed to a correspondingly different photocell. In this regard, each lens zone would be separated by zones of total internal reflection which would insure that the scene radiation collected by each of the lens elements would be directed along separate paths to individual photocells.

The present invention contemplates other embodiments. For example, it contemplates that the optical assembly be comprised of the optical element 40 provided with a slot similar to slot 94. Towards that end, there would be provided an air gap or zone between the lens portions 52, 54. Such an air gap would provide for total internal reflection as the slot 94. Of course, there would be no need for the optical member 84. Besides an air gap, of course, it is within the scope of this invention that other transmissive mediums having a lower index of refraction than the portions 52, 54 may be sandwiched between the segments 52, 54. Further, the present invention contemplates that the optical member 84 itself may have the photocells 44, 46 embedded therein.

It is believed the operation of the compact optical arrangement in a scene evaluating arrangement is obvious from the foregoing. As noted earlier, the present invention can be used in the dual photocell systems set forth in commonly-assigned and copending application Ser. No. 108,381. The operation of the flash and exposure control system is not believed necessary to understanding the operation of the present invention. However, their operations are disclosed more fully in Ser. No. 108,381 wherein the electronic switching between the photocells 44, 46 takes place in response to initiation and cessation of flash.

Since certain changes may be made in the above-described method and apparatus without departing from the scope of the invention herein involved, it is intended that all matter contained in the description or shown in the accompanying drawings shall be interpreted as illustrative and not in a limiting sense.

What is claimed is:

1. An optical assembly for use in controlling the direction of radiation from a scene to at least one of a plurality of closely-spaced photoresponsive regions spaced from said assembly and scene along a given optical axis comprising:

optical means having different optical segments for optically directing scene radiation along independent paths traveling through and emerging from each of said segments to at least one region of the plurality of closely-spaced regions; and means spaced intermediate said segments and said regions and being optically associated with said optical segments for internally reflecting at least some of the scene radiation traveling along at least one of said paths, which would otherwise intersect the other of said paths, in front of the regions, so as to redirect the internally reflected scene radiation in a predicted direction to reduce optical crosstalk between the different paths.

2. The assembly of claim 1 wherein said internal reflecting means comprises means for establishing at least a given critical angle between it and at least one of said paths so that scene radiation of said one path which is incident to said reflecting means at an angle at or less than said critical angle is totally internally reflected.

3. The arrangement of claim 2 further including optical filtering means being optically associated with said optical segments for optically filtering scene radiation along at least one of said different paths.

4. The arrangement of claim 3 wherein said filtering means comprises a spectral filter.

5. The arrangement of claim 3 wherein each of said optical segments defines a focal position and each of said photoresponsive regions is located at or adjacent the focal position of the corresponding one of said optical segments, and said internal reflecting means is situated with respect to said optical segments and said photoresponsive means so as to increase the acceptance angle of each of said photoresponsive regions.

6. The arrangement of claim 2 wherein said internal reflecting means is comprised of a block member having at least a pair of segments made of at least partially transparent material.

7. The arrangement of claim 6 wherein said block segments are connected integrally and said internal reflecting means is defined by a slot in said block for establishing a total internal reflectance zone.

8. A compact scene evaluating arrangement for a camera, said arrangement comprising an array of radiation sensors mounted in a side-by-side, closely-spaced relationship, and means for directing light from the scene along a pair of independent paths to respective ones of said sensors, said directing means including an array of lens elements mounted over said sensor array in a side-by-side, closely-spaced relationship for directing scene light to each of said sensors with pairs of adjoining ones of said lens elements directing said scene light along converging paths such that portions thereof would intersect in front of said sensor array, and said directing means including a pair of adjoining surfaces associated with each said pair of lens elements for producing internal reflection of said light portions to redirect said portions to their respective underlying sensors.

9. The arrangement of claim 8 wherein each of said lens elements extends over a greater length as measured in the longitudinal direction of said lens array than the length of its corresponding sensor.

10. The arrangement of claim 8 wherein said light portions are directed at a given angle and said adjoining surfaces are angularly mounted such that said light portions intersect said surfaces at an angle less than the critical angle.

11. The arrangement of claim 10 wherein said adjoining surfaces are adjoining surfaces of each said pair of lens elements.

12. The arrangement of claim 10 wherein said adjoining surfaces are carried by a pair of transparent elements interposed between each said pair of lens elements and their respective pair of underlying sensors.

13. A method of controlling scene radiation toward at least one of a plurality of closely-spaced photo-responsive regions comprising the steps of:

optically directing scene radiation along different paths by optical segments to at least one of the regions; and redirecting at least some of the scene radiation, traveling through the optical segments which would otherwise intersect other paths intermediate, the optical segments and the regions, in a preselected direction by internally reflecting said scene radiation, in such a manner and direction as to reduce optical crosstalk between the different paths whereby scene radiation from one path does not intersect the other paths.

14. The method of claim 13 wherein the step of reducing the crosstalk includes the step of establishing a zone of total internal reflection for at least one of the paths.

15. The method of claim 13 wherein the photoresponsive regions are located at a focal plane and said step of optically redirecting scene radiation is carried out so that the redirected scene radiation increases the field of view of at least one of said photoresponsive regions.

* * * * *